R. A. DUNBAR.
PHONOGRAPH.
APPLICATION FILED MAR. 31, 1916.
1,217,723. Patented Feb. 27, 1917.
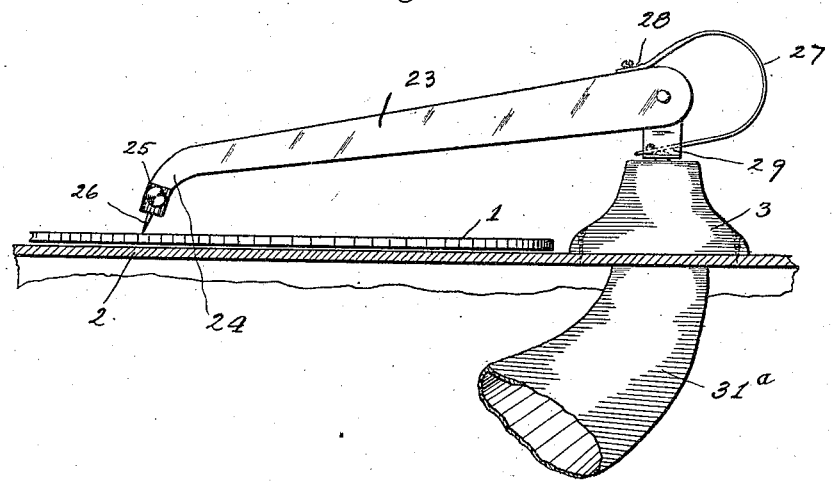
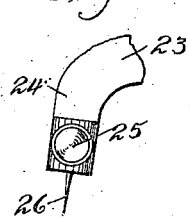
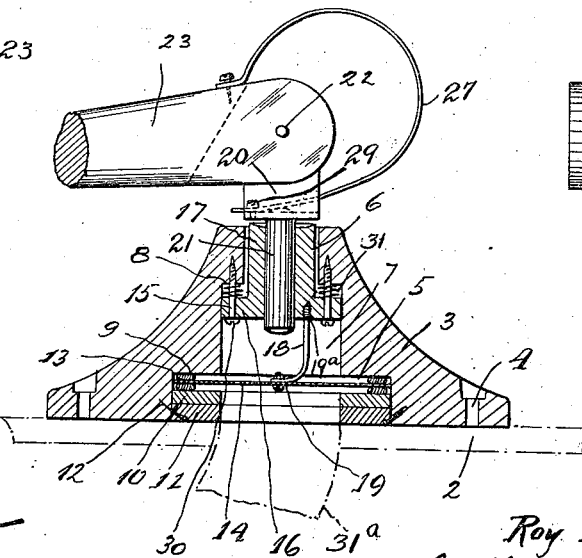
WITNESSES
G. Higgins
D. E. Jenkins
INVENTOR
Roy A. Dunbar
By Max H. Srolonz
ATTORNEYS ered upon the record disk, will cause

UNITED STATES PATENT OFFICE.

ROY A. DUNBAR, OF EVANS CITY, PENNSYLVANIA.

PHONOGRAPH.

1,217,723.   Specification of Letters Patent.   Patented Feb. 27, 1917.

Application filed March 31, 1916. Serial No. 87,917.

*To all whom it may concern:*

Be it known that I, ROY A. DUNBAR, a citizen of the United States, residing at Evans City, in the county of Butler and State of Pennsylvania, have invented certain new and useful Improvements in Phonographs, of which the following is a specification.

This invention relates to phonographs and has for its object to provide a machine of such type, in a manner as hereinafter set forth, whereby its solid arm is employed for transferring vibration from the needle to an element connected with the reproducer disk for the purpose of vibrating the latter to create sound waves.

Further objects of the invention relate to the providing of a phonograph which is simple in its construction and arrangement, strong, durable, efficient in its use, and inexpensive.

With the foregoing and other objects in view the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation, broken away, of a phonograph in accordance with this invention.

Fig. 2 is a detail illustrating the needle.

Fig. 3 is a sectional elevation illustrating an element of the machine.

Fig. 4 is a detail of a transferring arm joint.

Referring to the drawings in detail 1 denotes a revolving element for a phonograph record disk and which is mounted upon the top of the base 2 of the machine and operated in a known manner.

Mounted upon the base 2 is a tapering support 3, having openings 4 for the passage of securing devices for connecting said support with the base 2. The support 3 has a centrally disposed stepped opening and that portion of larger diameter, which is the lower part of the opening, is indicated at 5. The upper part of the opening, which is indicated at 6, is the portion of smaller diameter and the intermediate part of said opening is indicated at 7, and which is of greater diameter than the upper portion 6, but of less diameter than the lower portion 5. By providing the opening with three different diameters, the wall of said opening is formed with shoulders 8, 9.

Arranged within the lower portion 5 of the opening in the support 3, is a pair of washers 10, 11, which are superposed with respect to each other, and the washers 11 have securing devices 12 extending therethrough, and in the support 3 whereby said washer 11 is fixedly maintained in position.

Interposed between the washer 10 and shoulder 9 is a supporting member 13 for a reproducer disk 14 which is preferably constructed of mica and said disk 14 is spaced from the shoulder 9, as well as the washer 10, and extends across the openings in the support 3.

Depending from the shoulder 8 are a plurality of hangers 15 upon which is loosely mounted the flange 16 of a reciprocatory sleeve 17, the latter extending up through the upper portion 6 of the opening and of such diameter with respect to the diameter of said portion whereby said sleeve 17 will be slightly spaced from the wall thereof. The sleeve 17 is connected with the disk 14, by a curved controlling arm 18; which is fixed, as at 19, to the disk 14, and as 19ª to the sleeve 17. The reciprocatory motion of the sleeve 17 will be conducted by the arm 18 to the disk 14 causing the latter to vibrate and create sound waves.

The reference character 20 denotes a harp, having a stem 21 depending therefrom and which projects through the sleeve 17. Pivotally mounted by the pivot pin 22, which is carried by the harp 20, is the rear end of a solid transferring arm 23, which has its forward end bent downward as at 24, and has detachably connected therewith, by the set screw 25, a needle 26, the latter being adapted to travel in the record disk 2. The arm 23 is preferably constructed of light material, such as wood, or aluminum, and when constructed of such material a bow-shaped spring 27 is employed, which is connected at its upper end, as at 28, to the rear of the top edge of the arm 23, and at its lower end is connected as at 29, within the yoke, to the base thereof. The arm 23 may be constructed of solid steel or brass and when such material is employed the spring 27 is dispensed with.

The arm 23 is adapted to transfer the vibratory motion of the needle 26 to the stem 21 and the movement of the stem 21, is transferred to the sleeve 17, causing the same to reciprocate, and as the sleeve 17 is connected with the disk 14, by the arm 18 the latter will transfer the motion of the sleeve 17 to the disk 14, causing the latter to vibrate.

The manner of setting up the yoke and stem with respect to the sleeve 17, will permit of the yoke swinging with respect to the sleeve 17, and as the arm 23 is pivotally connected with the yoke, it is obvious that the connection between the sleeve 17 and the arm will permit of the arm swinging not only upon a horizontal pivot but also a vertical pivot.

The heads 30 of the hangers 15 arrest downward movement of the sleeve 17.

Attached to the washers 11 is a horn 31ª.

Loosely mounted upon the hangers 15, between the flange 16 of the member 17 and the shoulder 8 are springs 31 which prevent the flange 16 contacting with the shoulder 8 and which furthermore tend to assist in the reciprocatory movement of the sleeve 17.

The coil springs 31 and the hangers 15 cause the supporting member 17 to vibrate while the disk 14 is held rigid in the support 3. The pivot pin 22 constitutes a friction joint and does not cause a loss of the vibration, but the joint is held closed until the vibrations reach the mica disk. The springs around the hangers, are what may be termed, the only open joint and permit the inner section to vibrate while the mica disk is held in position. The disk 14 is held in position by the washers 10, 11, arranged on each side thereof, and by such an arrangement the full vibration from the needle to the disk is obtained.

What I claim is:—

1. A phonograph comprising a reciprocatory sleeve, a solid arm transferring vibration from a phonograph needle to said sleeve, means to provide a horizontal and vertical pivotal connection between said arm and said sleeve, a reproducer disk, and an arm connecting the sleeve to said disk.

2. A phonograph comprising a reciprocatory sleeve, a solid arm transferring vibration from a phonograph needle to said sleeve, means to provide a horizontal and vertical pivotal connection between said arm and said sleeve, a reproducer disk, an arm connecting the sleeve to said disk, and a spring having one end attached to said connection and its other end to the rear end of said transferring arm.

3. A phonograph comprising a reciprocatory flanged sleeve, a support having said sleeve arranged therein, an arm transferring vibrations from a phonograph needle to said sleeve, means to provide a horizontal and a vertically disposed pivotal connection between said arm and said sleeve, a reproducer disk mounted in said support below the sleeve, an arm connecting said sleeve to said disk, hangers fixed within said support and extending through the flange of the sleeve, and springs loosely mounted on the hangers and engaging the upper face of the flange.

4. A phonograph comprising a reproducer disk, a solid arm for transferring vibrations from the phonograph needle, a connection between said arm and said disk whereby the vibrations transferred by the arm are conducted to said disk to create sound waves, said connection including a flanged sleeve mounted on hangers and springs carried by the hangers and bearing against the upper face of the flange of the sleeve and a bow-shaped spring having one end attached to said connection and its other end secured to the rear end of said arm.

5. A phonograph comprising a reproducer disk, a solid arm for transferring vibrations from the phonograph needle, a connection between said arm and said disk whereby the vibrations transferred by the arm are conducted to said disk to create sound waves, and a support for said connection and disk, said connection including hangers secured to and depending within the support, a flanged sleeve slidably mounted on said hangers, and springs loosely mounted on the hangers and engaging the upper face of the flange of the sleeve.

6. A phonograph comprising a reproducer disk, a solid arm for transferring vibrations from the phonograph needle, a connection between said arm and said disk whereby the vibrations transferred by the arm are conducted to said disk to create sound waves, a bow-shaped spring having one end attached to said connection and its other end secured to the rear end of said arm, and a support for said connection and disk, said connection including hangers arranged within the support, a flanged sleeve slidably mounted upon said hangers and springs surrounding the hangers and engaging the upper face of the flange of the sleeve.

7. A phonograph comprising a reciprocatory flanged sleeve, a support having said sleeve arranged therein, an arm transferring vibrations from a phonograph needle to said sleeve, means to provide a horizontal and a vertically disposed pivotal connection between said arm and said sleeve, a reproducer disk mounted in said support below the sleeve, an arm connecting said sleeve to said disk, hangers fixed within said support and extending through the flange of the sleeve, and springs loosely mounted on the hangers and engaging the upper face of the flange, and a spring having one end attached to said connection and its other end to the rear end of said transferring arm.

In testimony whereof I affix my signature in the presence of two witnesses.

ROY A. DUNBAR.

Witnesses:
E. B. EVANS,
RAY ELLIOTT.

Copies of this patent may be obtained for five cents each, by addressing the "Commissioner of Patents, Washington, D. C."